(12) United States Patent  
Skovgaard

(10) Patent No.: US 12,549,914 B2  
(45) Date of Patent: Feb. 10, 2026

(54) METHOD FOR DISPLACEMENT MEASUREMENT IN A DRIVER AND SPEAKER

(71) Applicant: Goertek Inc., Shandong (CN)

(72) Inventor: Frederik Skovgaard, Shandong (CN)

(73) Assignee: Goertek Inc., Weifang (CN)

( * ) Notice: Subject to any disclaimer, the term of this patent is extended or adjusted under 35 U.S.C. 154(b) by 1102 days.

(21) Appl. No.: 17/040,651

(22) PCT Filed: Sep. 6, 2018

(86) PCT No.: PCT/CN2018/104266  
§ 371 (c)(1),  
(2) Date: Sep. 23, 2020

(87) PCT Pub. No.: WO2020/047791  
PCT Pub. Date: Mar. 12, 2020

(65) Prior Publication Data  
US 2021/0021918 A1    Jan. 21, 2021

(51) Int. Cl.  
*H04R 29/00* (2006.01)  
*G01D 5/30* (2006.01)  
*G01D 5/34* (2006.01)

(52) U.S. Cl.  
CPC ............ *H04R 29/001* (2013.01); *G01D 5/30* (2013.01); *G01D 5/34* (2013.01)

(58) Field of Classification Search  
CPC ........ H04R 1/028; H04R 29/001; H04R 9/06; H04R 2499/11; H04R 2499/15; H04R 3/007; H04R 1/023; H04R 1/06; H04R 2307/025; H04R 2400/11; H04R 29/003; H04R 31/003; H04R 7/125; H04R 7/127;

(Continued)

(56) References Cited

U.S. PATENT DOCUMENTS

| | | | |
|---|---|---|---|
| 6,694,037 B1 * | 2/2004 | Robinson | H04R 9/02 |
| | | | 381/401 |
| 9,967,664 B1 | 5/2018 | Quek et al. | |
| 10,149,078 B2 | 12/2018 | Hogan et al. | |
| 2001/0024509 A1 * | 9/2001 | Carver | H04R 1/2834 |
| | | | 381/386 |

(Continued)

FOREIGN PATENT DOCUMENTS

| | | | | |
|---|---|---|---|---|
| CN | 2319986 | * | 5/1999 | |
| CN | 2319986 Y | | 5/1999 | |
| CN | 202713603 U | | 1/2013 | |
| EP | 1569497 A1 | * | 8/2005 | ............ H04R 3/002 |
| JP | H06284492 | * | 10/1994 | |
| WO | WO 2018/128936 A1 | | 7/2018 | |

OTHER PUBLICATIONS

English translation of CN2319986, published May 19, 1999. (Year: 1999).*

(Continued)

*Primary Examiner* — Christina A Riddle  
(74) *Attorney, Agent, or Firm* — Baker Botts LLP

(57) ABSTRACT

A method for displacement measurement in a driver and a speaker are disclosed. The method comprises, choosing a stationary position for fixing an optical sensor inside or outside the driver, placing the optical sensor by using the stationary position, wherein the optical sensor is in line-of-sight to a moving part of the driver and faces the moving part; receiving, by the optical sensor, light reflected by or transmitting through the moving part, and processing, by a processing device, signals for the received light from the optical sensor to calculate displacement of the moving part.

6 Claims, 3 Drawing Sheets

(58) Field of Classification Search
CPC ...... H04R 9/045; H04R 23/008; H04R 9/025; H04R 9/066; H04R 9/063; H04R 9/08; H04R 29/002; H04R 9/043; H04R 3/002; H04R 3/02; H04R 29/00–008; G01D 5/30; G01D 5/34; G01D 5/28; G01K 13/00; G01S 17/08; G01B 11/14; G01B 11/026; G01B 11/0608; G01B 11/02; G01B 11/03; G01B 11/028; G01B 21/02; G01B 11/0691; G01B 11/06; G01B 11/00; G01B 21/00; G01B 21/04; G01B 21/042; G01B 21/045; G01B 21/047; G01B 21/12; G01B 21/16; H02K 11/22; G01R 31/28; G01R 31/2635
USPC ................ 381/55, 58–60; 356/614–624
See application file for complete search history.

(56) References Cited

U.S. PATENT DOCUMENTS

| 2007/0076914 | A1* | 4/2007 | Takagi | H04R 9/06 381/396 |
| 2016/0094926 | A1* | 3/2016 | Hosoda | G01H 9/00 381/59 |
| 2016/0302018 | A1* | 10/2016 | Russell | G01L 1/242 |
| 2018/0192217 | A1 | 7/2018 | Hogan et al. | |

OTHER PUBLICATIONS

English translation of Jp H06284492, published Oct. 7, 1994. (Year: 1994).*

* cited by examiner

METHOD FOR DISPLACEMENT MEASUREMENT IN A DRIVER AND SPEAKER

CROSS-REFERENCE TO RELATED APPLICATIONS

This application is a National Stage of International Application No. PCT/CN2018/104266, filed on Sep. 6, 2018, which is hereby incorporated by reference in its entirety.

FIELD OF THE INVENTION

The present invention relates to technical field of audio technology, and more specifically, to a method for displacement measurement in a driver and a speaker.

BACKGROUND OF THE INVENTION

Displacement measurement can be used for driver performance enhancements. For example, in a driver of an electronics apparatus such as a speaker, a displacement measurement and prediction can be used as input for several DSP features. For example, a displacement limiter can be provided and limit the driver when it is being driven so loud that it exceeds its Z-max !maximum safe displacement or movement.

Currently, the displacement measure approach is cumbersome and consumes a lot of space, which will limit the driver design and integration. Furthermore, the performance of the driver may be impacted because an extra component is placed on the moving part.

SUMMARY OF THE INVENTION

One object of this invention is to provide a new technical solution for displacement measurement in a driver.

According to a first aspect of the present invention, there is provided a method for displacement measurement in a driver, comprising: choosing a stationary position for fixing an optical sensor inside or outside the driver; placing an optical sensor by using the stationary position, wherein the optical sensor is in line-of-sight to a moving part of the driver and faces the moving part; receiving, by the optical sensor, light reflected by or transmitting through the moving part; and processing, by a processing device, signals for the received light from the optical sensor to calculate displacement of the moving part.

According to a second aspect of the present invention, there is provided a speaker, comprising: a housing; a speaker unit mounted in the housing, which includes a moving part; and an optical sensor, which is placed by using a chosen stationary position of the speaker and which is in line-of-sight to the moving part and faces the moving part, wherein the optical sensor receives light reflected by or transmitting through the moving part, and sends signals for the light to an internal or external processing device so that the processing device processes the signals for the received light from the optical sensor to calculate displacement of the moving part.

According to an embodiment of this disclosure, the displacement measurement is non-intrusive and thus does not impact the performance of the driver.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

DETAILED DESCRIPTION OF THE EMBODIMENTS

Figure 1:
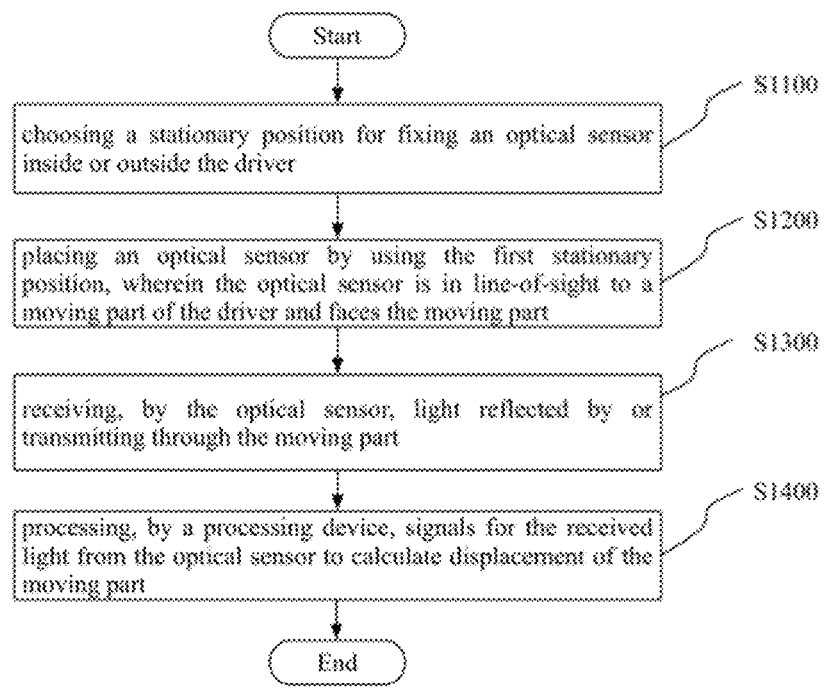
FIG. 1 is an illustrative flow chart of a method for displacement measurement in a driver according to a first embodiment of this disclosure.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

FIG. 1 is an illustrative flow chart of a method for displacement measurement in a driver according to a first embodiment of this disclosure.

At step S1100, a stationary position for fixing an optical sensor inside or outside the driver is chosen.

At step S1200, the optical sensor is placed by using the stationary position. The optical sensor is in line-of-sight to a moving part of the driver and faces the moving part.

At step S1300, the optical sensor receives light reflected by or transmitting through the moving part.

At step S1400, a processing device processes signals for the received light from the optical sensor to calculate displacement of the moving part.

Here, the optical sensor is non-intrusive and thus does not impact the performance of the driver. Furthermore, the optical sensor can directly monitor the movement of the moving part of the driver. So, the result can directly indicate the moving position of the moving part. As a result, the output of the measurement can directly and precisely indicate the closeness of the driver to its maximum safe displacement. The displacement measurement can indicate the driving degree of the driver and enable a bass boost without causing distortion.

This precise displacement measurement can enable a designer to set up a precise margin for the driver. Otherwise, the designer has to add a substantial safety margin due to unknown factors such as variation in material properties, variation in parts in the system such as rear cavity and driver parts, aging of materials/changes of material parameters over time, changes in acoustic in the room and so on. Because the displacement measurement in the embodiment can be independent of the operation of the driver, these unknown factors will have no or little impact on the measurement.

This direct displacement measurement in this embodiment enables a designer to get more performance out of an acoustic system with active speakers. Furthermore, this accurate displacement measurement can enable room compensation features, since a designer can use displacements of the driver at different frequencies to estimate what the room properties are. Here, the driver could be a speaker unit of a speaker.

Based on the embodiment showed in FIG. 1, another embodiment of the present disclose further comprises:

At step S1100, choosing a stationary position comprises choosing at least one of the following positions as the stationary position: a position at a pole piece of a magnet system of the driver, a position at a basket of the driver and a position external to the driver.

For example, choosing a stationary position further comprises: choosing a fixing part of the basket of the driver as the stationary position, which is used for fixing the driver on a housing. Choosing a fixing part of the basket of the driver as the stationary position may further comprise: choosing an upper surface or a lower surface of a part of the basket where a bolt hole is located, as the fixing part of the basket.

The fixing part of the basket of the driver for fixing the driver on a housing is generally the most table part of a speaker. When it is fixed on the housing, the part will not move and can provide a stable base for the optical sensor. Furthermore, the mounting of the optical sensor may adopt the same manner as the mounting of the driver into the housing, such as a bolt-nut mounting. In this manner, the process of mounting the optical sensor may be simplified.

In another example, choosing a stationary position may further comprise: choosing a position on an external housing for the driver as the stationary position. Compared with the solutions of choosing a position in the driver, this will provide a more freedom to a designer to choose where to put the optical sensor.

At step S1200, placing an optical sensor may further comprise: forming a support element; and setting one end of the support element to attach the stationary position and the other end of the support element connecting with the optical sensor. For example, the forming a support element may comprise: forming the support element with at least two branches, which are not parallel and are radial from the optical sensor. This will provide a relatively stable support for the optical sensor. Here, forming a support element may further comprise: arranging the at least two branches of the support element in a plane which has a projection plane parallel with a vibration direction of the moving part.

Because the displacement in the vibration direction is mainly concerned in this invention, this structure will provide a stable support in this direction so that the sensing of the optical sensor could output a relatively accurate result.

In an example, placing an optical sensor may further comprise: placing the optical sensor in a tilt direction to face the moving part. The tilt direction is a direction tilt with respect to the main axis of the driver or an end plane of the driver, which is perpendicular to the main axis. In this manner, a designer will have more freedom to place the optical sensor.

In another example, placing an optical sensor an optical sensor may further comprise: placing the optical sensor in a cavity of the driver remote to terminals of the driver. As such, the optical sensor will not conflict with the arrangement of the terminals and/or the interferences therebetween (in electromagnetism aspect or in design room aspect) will be reduced.

In still another example, the position at the pole piece is a position at an inner surface of a hollow structure inside the pole piece and at a lower end of the pole piece close to a diaphragm of the driver, and the moving part is an inner surface of a coil former of the driver. As such, placing an optical sensor at the stationary position may further comprise: placing the optical sensor inside the hollow structure of the pole piece through the support element and arranging the optical sensor to face the inner surface of the coil former. On one hand, generally, no extra element will be placed inside the pole piece. So, this arrangement will use a spare room in the driver and will not require an extra room. Besides, the moving part moves with respect to the pole piece, and placing the optical sensor on the pole piece will provide a precise and direct result of the displacement. Accordingly, the measurement may be more exact.

Figure 2:
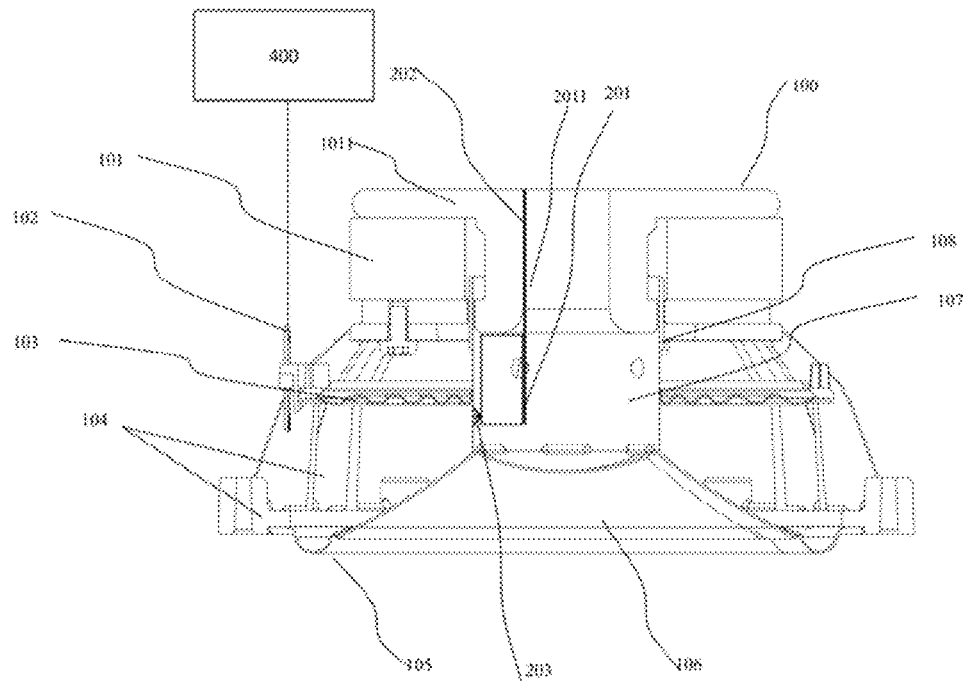
FIG. 2 is a schematic diagram showing the arrangement of a sensor for displacement measurement according to a second embodiment of this disclosure.

For example, placing an optical sensor at the stationary position may further comprise: arranging the optical sensor with a part of the optical sensor pressing against the lower end of the pole piece, referring to the example in FIG. 2. This will enhance the stability of the support to the optical sensor.

In an example, the moving part is a coil former, a coil or a diaphragm of the speaker unit. The optical sensor is in a direct line-of-sight to the coil former, the coil or the diaphragm and tracks the movements thereof. Preferably, the optical sensor looks at the coil former. The coil former and the coil are directly coupled to the diaphragm and the movements thereof can directly reflect the movement of the diaphragm.

In this regard, the method may further comprises: choosing the moving part to be a coil of the driver; and/or choosing the moving part to be an inner surface of a coil former of the driver; and/or choosing the moving part to be an outer surface of a coil former of the driver, which is at a lower part of the coil former, and the lower part is close to a diaphragm of the driver; and/or choosing the moving part to be a front surface of a diaphragm of the driver, or to be an inner surface of the diaphragm of the driver. Accordingly, the step S300 may comprises: receiving, by the optical sensor, light reflected by or transmitting through a preset area of the coil, the coil former and/or the diaphragm. The preset area is an area enabling the optical sensor to scan light from the moving part. And in this solution the displacement prediction can be achieved by monitoring the driver's moving part of its own, which removes the need for adding more moving parts on the speaker unit.

The optical sensor can be placed anywhere with line-of-sight to the moving part in the driver. This will remove the need for adding a component on the moving part to sense its movements.

The processing device can be separate from the optical sensor or be integrated with the optical sensor. It will be appreciated by a person skilled in the art that the processing device may be implemented in various manners. It can be carried out through discrete devices, ASIC, a programmable device such PLD, DSP, FPGA. Alternatively, it can be implemented in a combination of a processing unit such as a CPU or a MPU and a memory, wherein instructions are stored in the memory and are used to control the processing unit to performing corresponding operations. In this regard, this disclosure will not limit the implementation manners of them. A person skilled in the art can choose the implementation manners under the teaching of this disclosure in consideration of the cost, the market availability and so on.

The optical sensor could perform any suitable type of optical sensing. Some of the optical sensors do not need a specific light source for the sensing.

In an example, the optical sensor is a Doppler-based optical sensor. It senses the Doppler effect of the received light. The processing device calculates the displacement based on Doppler Effect of the received light.

In another example, a tracking pattern can be provided on the surface of the moving part. The tracking pattern can be any pattern which can indicate the movement of the moving part. For example, it can be a serial of lines arranged along the moving direction of the moving part whose thicknesses indicate the moving position of the moving part.

The processing device can take pictures of the tracking pattern at short intervals based on the received light and calculate the displacement by correlating the pictures.

In still another example, a gradient map may be provided on the surface of the moving part. The processing device may calculate the displacement by measuring the received light reflected by the gradient map.

Other optical sensors may use their own light source for the sensing.

For example, in the method forth is embodiment, an optical emitter may be placed at an extra stationary position, which is in line-of-sight to the moving part of the driver. The optical emitter emits the light to be reflected by or transmit through the moving part. The optical emitter may be placed at the same side of the moving part or at a side opposite to the optical sensor with respect to the moving part. So, the optical sensor can receive light reflected or transmitting through the moving part. In the later situation, the moving part will be transparent for the light to be sensed by the optical sensor.

In an example, the stationary position and the extra stationary position are same position, and the optical emitter and the optical sensor are integrated and are placed at the same position. For example, the optical sensor and the optical emitter are those of an optical encoder.

In another example, the processing device calculates the displacement based on the intensity of the received light.

It would be appreciated by a person skilled in the art that light sources (optical emitters) may also be provided for the optical sensors exemplified in the examples which do not need a specific light source for the sensing.

The stationary position could beat a stationary support part of the driver. Similarly, the stationary position could also be at a stationary support part of the driver. Alternatively, it could beat a stationary structure external to the driver, for example, a stationary structure on the housing of a speaker. Here, the optical sensor may be removable and/or replaceable. As a result, the failure of the displacement measurement may not impact the performance of the driver.

The light emitted by the optical emitter and/or received by the optical sensor may be in the non-visible spectra. In this regard, the running of the displacement measurement may not disturb the user.

FIGS. 2-6 schematically show the arrangements of a sensor for displacement measurement according to embodiments of this disclosure. In FIGS. 2-6, a speaker, which the above embodiments are applied to, is provided. The repetitive description in the embodiments with respect to the first embodiment will be omitted.

The speaker may include: a housing 300; a speaker unit 100 mounted in the housing 300; and an optical sensor 201, 211, 221, 231 or 241. The speaker unit 100 includes a moving part. The housing 300 is shown in FIG. 6 and is omitted in FIGS. 2-5.

The optical sensor 201, 211, 221, 231 or 241 is placed by using a chosen stationary position 202, 212, 222, 232 or 242 of the speaker and is in line-of-sight to the moving part and faces the moving part. The optical sensor 201, 211, 221, 231 or 241 receives light reflected by or transmitting through the moving part. The speaker may further include an internal or external processing device 400. The optical sensor 201, 211, 221, 231 or 241 sends signals for the light to the internal or external processing device so that the processing device processes the signals for the received light from the optical sensor 201, 211, 221, 231 or 241 to calculate displacement of the moving part. The speaker unit 100 is the driver as described above. The processing device 400 is shown in FIG. 2 and is omitted in FIGS. 3-6.

The optical sensor 201, 211, 221, 231 or 241 may be placed at the stationary position 202, 212, 222, 232 or 242 through a support element 2011, 2111, 2211, 2311 or 2411. For example, the support element has at least two branches, which are not parallel and are radial from the optical sensor. Alternatively, the at least two branches of the support element are arranged in a plane which has a projection plane parallel with a vibration direction of the moving part.

As shown in FIGS. 2-6, the speaker unit 100 includes a magnet system 101, terminals 102, a spider 103, a basket 104, a surround 105, a diaphragm 106, a coil former 107 and a coil 108. Here, the moving part may be the coil former 107, the coil 108 or a diaphragm 106.

For example, the stationary position is a position 202 at a pole piece 1011 of a magnet system 101 of the speaker unit, a position 212, 222 or 232 at a basket 212 of the speaker unit or a position 242 external to the speaker unit 100. FIGS. 2-6 shows several examples of different arrangements.

As shown in FIG. 2, the stationary position is a position 202 at a pole piece (or T yoke) 1011. The position 202 at the pole piece 1011 is a position 202 at an inner surface of a hollow structure inside the pole piece. The hollow structure may be a through hole as shown in FIG. 2 or be a recess at the lower end of the pole piece 1011 towards the diaphragm 106. The position 202 may be at a lower end of the pole piece close to a diaphragm 106 of the speaker unit 100. Here, the lower end means it can provide support through the lower end of the pole piece. The moving part is an inner surface of a coil former 107 of the speaker unit 100. The optical sensor 201 is placed inside the hollow structure through a support element 2011 and is arranged to face the inner surface of the coil former 107. The support element 2011 may be a metal frame or a plastic frame. One end of the support element 2011 is placed on the stationary support part 202 and the optical sensor 201 is supported at the other end of the support element 2011. Because the coil former 107 moves with respect to the magnet system 101 to drive the diaphragm 106, the result of the optical sensor 201 placed on Pole piece 1011 of the magnet system 101 will directly reflect the displacement with respect to the magnet system 101 and remove the impact of minor displacement of the magnet system 101.

In an example, the optical sensor 201 is placed with a part of the optical sensor pressing against the lower end of the pole piece 1011. The support element 2011 and the pole piece 1011 provide a stable support to the optical sensor 201. The error caused by the movement of the optical sensor 201 during sensing can be relieved or removed in this manner.

Furthermore, the support element 2011 may have at least two branches, for example, three branches, which are not parallel and are radial from the optical sensor 201. This arrangement may increase the stability of the support.

The optical sensor 201 scans area 203 on the coil former 107, which is an inner surface of the coil former 107. Generally, components of a microphone unit are arranged outside the coil former and the insider space thereof is not used. In this embodiment, the optical sensor 201 is arranged inside the coil former, and uses the un-used space. So, this design will not increase the overall volume of the speaker unit. Furthermore, the coil former 107 is a rigid component and the measurement thereof will be constant. This measurement result will be of benefit to a processing device to determine the status of a diaphragm based on a constant criterion.

In this example, the area 203 is the inner surface at the lower part of the coil former 107, which is close to the diaphragm 106. The lower part of the coil former will be connected to the diaphragm 106 and drive it to vibrate. In a case where the displacement of a diaphragm is concerned, this arrangement will provide a more precise result.

Figure 3:
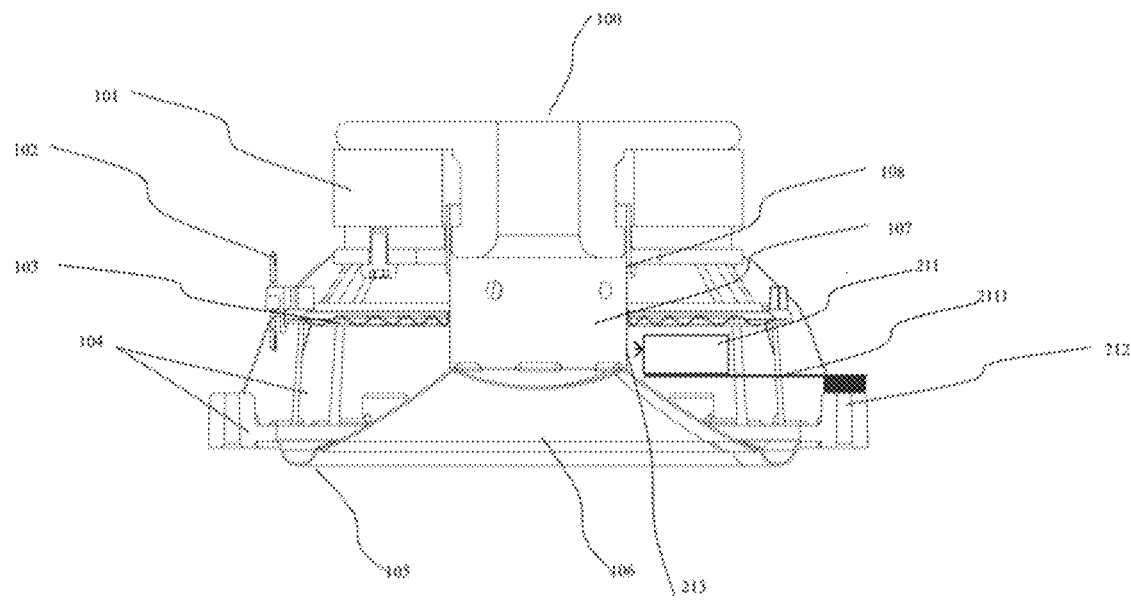
FIG. 3 is a schematic diagram showing the arrangement of a sensor for displacement measurement according to a third embodiment of this disclosure.
Figure 4:
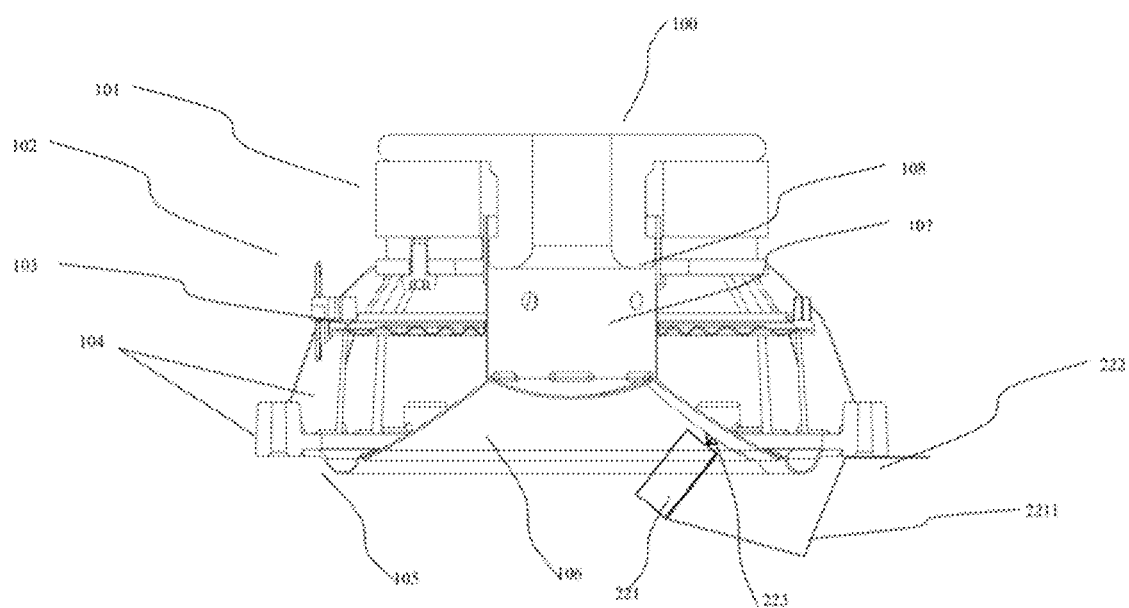
FIG. 4 is a schematic diagram showing the arrangement of a sensor for displacement measurement according to a fourth embodiment of this disclosure.
Figure 5:
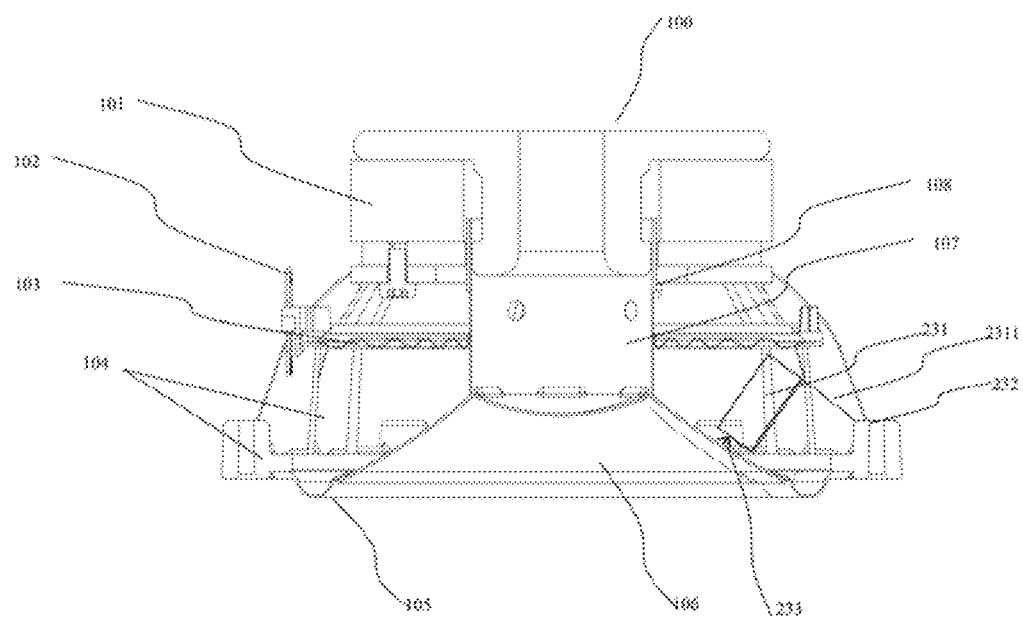
FIG. 5 is a schematic diagram showing the arrangement of a sensor for displacement measurement according to a fifth embodiment of this disclosure.
Figure 6:
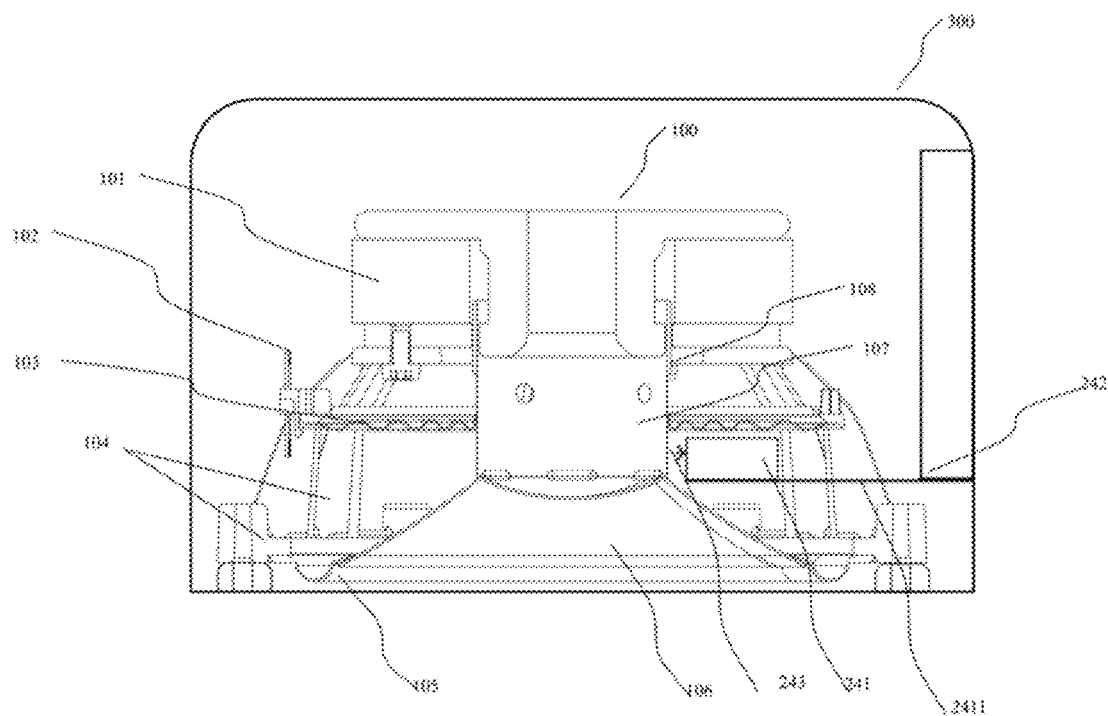
FIG. 6 is a schematic diagram showing the arrangement of a sensor for displacement measurement according to a sixth embodiment of this disclosure.

FIGS. 3-5 show the stationary position at the basket 104 of the speaker unit 100. The stationary position at the basket 104 is at a fixing part of the basket 104 of the speaker unit 100, which is used for fixing the speaker unit 100 on the housing 300. The fixing part of the basket is an upper surface or a lower surface of a part 212, 222 or 232 of the basket 104 where a bolt hole is located.

As shown in FIG. 3, the stationary position is an upper surface of a part 212 of the basket 104. The optical sensor 211 is fixed on the upper surface of the part 212 of the basket 104. The part 212 of the basket 104 is the fixing part for fixing the speaker unit 100 onto the housing 300. For example, the basket 104 is fixed on the housing 300 through a bolt. The stationary part may be the part 212 where the bolt hole is located. The fixing part is generally a relatively stable part of the speaker unit and this arrangement will provide a stable support to the optical sensor 211, which may lead to a more accurate sensing result.

The optical sensor 211 is placed on the part 212 of the basket 104 through a support element 2111 similar to the support element 2011. The support element 2111 may have at least two branches. Generally, the vibration direction of the coil former 107 is up-down direction, which is the concerned direction of the sensing. In this regard, the at least two branches of the support element 2111 may be arranged in a plane which has a projection plane parallel with the vibration direction. In this manner, the support element 2011 can provide a stable support with respect to the sensing plane.

In this example, the optical sensor 211 scans area 213 on the coil former 107. The area 213 is an outer surface of the coil former 107. As explained above, the area 213 may be located at the lower part of the coil former 107, which is close to the diaphragm 106.

As shown in FIG. 4, the stationary position is a lower surface of a part 222 of the basket 104. The optical sensor 221 is fixed on the lower surface of the part 222 of the basket 104. In this example, similar to the embodiment of FIG. 3, the part 222 of the basket 104 is also the fixing part of the speaker unit 100. The optical sensor 221 is fixed on the fixing part through a support element 2211. One end of the support element 2211 is placed on the lower surface of the fixing part and the optical sensor 221 is placed on the other end the support element 2211.

The optical sensor 221 is arranged in front of the diaphragm 106 and scans front surface area 223 of the diaphragm 106. In this case, the optical sensor is mounted outside the driver.

As shown in FIG. 5, the stationary position is an upper surface of a part 232 of the basket 104. The optical sensor 231 is fixed on the upper surface of the part 212 of the basket 104. In this example, similar to the embodiment of FIG. 3, the stationary support part 232 is also the fixing part of the speaker unit 100. The optical sensor 231 is fixed on the fixing part through a support element 2311. One end of the support element 2311 is placed on the upper surface of the fixing part and the optical sensor 231 is placed on the other end the support element 2311.

The optical sensor 231 is arranged in a tilt direction so that it is placed towards the inner surface of the diaphragm and scans the inner surface area 203 on the diaphragm 106. The optical sensor 231 is placed inside the speaker unit 100 and will not take up space outside the speaker unit. Here, the optical sensor 231 may not have a light source (optical emitter) and may receive light transmitting through the diaphragm 106.

In FIGS. 4 and 5, the optical sensor 221 or 231 is arranged in a tilt direction to face the moving part 106.

As shown in FIG. 6, the stationary position is a position 242 external to the speaker unit 100. The optical sensor 241 is fixed on the position 242 on the housing 300 through a support element 2411. The stationary support part 242 is outside the speaker unit 100. The optical sensor 241 scans area 243 on the coil former 107. The area 243 may be an outer surface at the lower part of the coil former 107, which is close to the diaphragm 106.

As shown in FIGS. 3-6, the optical sensor is arranged in the cavity of the speaker unit remote to the terminals 102 so that it will conflict with the arrangement of the terminals 102 and their related circuits.

The coil 108 is winded on the coil former 107. So, in the above embodiment, similar to the scanning of the coil former 107, the optical sensor may be also arranged to scan an area on the coil 108.

As described above, the optical sensor 201, 211, 221, 231 or 24 may be a Doppler-based optical sensor, and the processing device can calculate the displacement based on Doppler Effect of the received light.

For example, a tracking pattern is provided on the surface of the moving part such as the coil former 107, the coil 108 or a diaphragm 106. The processing device takes pictures of the tracking pattern at short intervals based on the received light and calculates the displacement by correlating the pictures.

For example, a gradient map is provided on the surface of the moving part such as the coil former 107, the coil 108 or a diaphragm 106. The processing device calculates the displacement by measuring the received light reflected by the gradient map.

For example, the speaker may further comprise: an optical emitter (not shown) which is placed at an extra stationary position of the speaker and is in line-of-sight to the moving part of the driver. The optical emitter emits the light to be reflected by or transmit through the moving part.

For example, the stationary position and the extra stationary position are same position, and the optical emitter and the optical sensor are integrated and are placed at the same position. In this regard, the optical sensor and the optical emitter may be those of an optical encoder.

For example, the processing device calculates the displacement based on the intensity of the received light.

For example, the light sensed or received by the optical sensor may be in the non-visible spectra.

Although some specific embodiments of the present invention have been demonstrated in detail with examples, it should be understood by a person skilled in the art that the above examples are only intended to be illustrative but not to limit the scope of the present invention.

What is claimed is:

1. A method for displacement measurement in a driver, comprising:
   choosing a stationary position for fixing an optical sensor positioned outside the driver, wherein the stationary position is a position located externally in a circumferential direction of a moving part of the driver and on an external housing for the driver, the driver comprises at least a basket, a coil former and a coil, and is installed in the external housing, the basket is adapted to fix the driver onto the external housing, and the coil former is arranged on an inner side in a circumferential direction of the coil;
   placing the optical sensor by using the stationary position, such that the optical sensor is in line-of-sight to the moving part of the driver and faces the moving part, wherein the moving part is an outer surface of the coil former of the driver, and the outer surface is positioned at a lower part of the coil former and is provided with a tracking pattern indicating movement of the moving part, and the lower part of the coil former is close to a diaphragm of the driver;
   receiving, by the optical sensor, at least one of light reflected by and transmitting through the moving part; and
   taking pictures of the tracking pattern at intervals, by a processing device, based on the received light and calculating displacement of the moving part by correlating the pictures.

2. The method according to claim 1, wherein placing the optical sensor further comprises: forming a support element; and
   setting a first end of the support element to attach the stationary position and a second end of the support element connecting with the optical sensor.

3. The method according to claim 2, wherein the forming the support element comprises: forming the support element with at least two branches which are not parallel and are radial from the optical sensor.

4. The method according to claim 3, wherein forming the support element further comprises:
   arranging the at least two branches of the support element in a plane which has a projection plane parallel with a vibration direction of the moving part.

5. A speaker, comprising:
   a housing;
   a speaker unit mounted in the housing, which includes at least a basket, a coil former comprising a moving part, a coil and a diaphragm, wherein the coil former is arranged on an inner side in a circumferential direction of the coil, the basket is adapted to fix the speaker unit onto the housing, the moving part is an outer surface of the coil former, the outer surface is positioned at a lower part of the coil former and is provided with a tracking pattern indicating movement of the moving part, and the lower part of the coil former is close to the diaphragm;
   an optical sensor, positioned corresponding to a chosen stationary position of the speaker which is a position located externally in a circumferential direction of the moving part and on the housing, and being in line-of-sight to the moving part and facing the moving part, wherein the optical sensor is adapted to receive light reflected by or transmitted through the moving part, and transmit signals for the light; and
   at least one of an internal and an external processing device, adapted to take pictures of the tracking pattern at intervals based on the received light and to calculate displacement of the moving part by correlating the pictures.

6. The speaker according to claim 5, wherein the optical sensor is placed at the stationary position through a support element;
   the support element has at least two branches, which are not parallel and are radial from the optical sensor;
   wherein the at least two branches of the support element are arranged in a plane which has a projection plane parallel with a vibration direction of the moving part.

* * * * *